United States Patent Office 2,886,512
Patented May 12, 1959

2,886,512

PROCESS FOR PREPARING A SILICA-ALUMINA GEL CATALYST AND A HYDROCARBON CRACKING PROCESS USING SAID CATALYST

Milton E. Winyall, Baltimore, Md., assignor to W. R. Grace & Co., New York, N.Y., a corporation of Connecticut No Drawing. Application August 30, 1955
Serial No. 531,593

8 Claims. (Cl. 208—120)

This invention relates to a novel method of preparing a catalyst composite, and particularly a silica-alumina cracking catalyst. In another aspect, it relates to a cracking process employing the catalyst prepared by the novel method.

Silica-alumina composites have found extensive commercial use as catalysts for the cracking of hydrocarbon oils, and as carriers for other catalytic agents which are used in a wide variety of processes. These composites usually contain a major portion of silica gel and a minor portion of alumina with a minimum of impurities. For example, cracking catalysts of this type usually consist of about 60–90% silica and about 10–40% alumina. Silica-alumina catalysts are generally prepared by first neutralizing a sodium silicate solution with a mineral acid, for example sulfuric acid, to form a silica hydrogel, which is then impregnated with an aluminum salt solution, and alumina is precipitated on the hydrogel by the addition of a base such as ammonia. The resulting silica-alumina composite is then washed to remove undesirable impurities and dried to form a catalyst. Alternatively, the thus formed silica hydrogel may be impregnated with a solution of a thermally decomposable aluminum salt such as aluminum nitrate, and subsequently treated at elevated temperatures to convert the aluminum salt to alumina. According to another method, silica-alumina catalysts are prepared by adding an aluminum salt, e.g. aluminum sulfate, directly to an alkali metal silicate solution. This results in the precipitation of a silica-alumina composite structurally somewhat different from the catalysts prepared by impregnating an already formed silica hydrogel with an aluminum salt. This latter method has a definite disadvantage in that the product formed is a zeolite, and the removal of sodium therefrom is exceedingly difficult. The soda impurities cannot be removed by ordinary water washing. Instead, a base exchange operation is necessary to lower the soda content of the finished catalyst to an acceptable level. While this latter method results in a saving in both mineral acid and basic precipitant over the first above-mentioned method, the cost of the base exchange operation tends to off-set the savings in acid and base.

Until this time, the most attractive method for preparing a silica-alumina gel cracking catalyst of high activity and purity and long catalyst life, both from the standpoint of economy and process simplicity, has been the Davison three-step process. Briefly, this process, which is the subject of co-pending U.S. patent application Ser. No. 401,031, filed December 29, 1953, is carried out as follows: (1) Form an alkaline silica hydrogel, i.e., pH circa 10, by incompletely neutralizing a sodium silicate solution with a mineral acid; (2) add an aluminum sulfate solution containing a small amount of free sulfuric acid to the hydrogel (resulting pH of the mixture: circa 3); and (3) add a sufficient quantity of ammonia to precipitate the alum as alumina in and on the hydrogel (pH of the final mixture: circa 7.5). The silica-alumina gel composite thus prepared is then filtered, washed free of soluble salts and dried. Notwithstanding the many advantages possessed by this process and the high quality of the catalyst thus produced, the three-step process consumes very appreciable quantities of both sulfuric acid and ammonia. The present invention provides a method containing one less process step which produces a catalyst equal to and in some respects superior to that produced by the three-step process, and yet accomplishes this result without the use of either sulfuric acid or ammonia. The novel method of the present invention thus provides very substantial savings in raw materials.

In accordance with the present invention, an aqueous alkali metal silicate solution is neutralized by the addition thereto of carbon dioxide. The silica hydrogel thereby formed contains dissolved alkali metal carbonate dispersed therethrough. To the thus formed silica hydrogel, there is then added an aqueous solution of an aluminum salt of a strong mineral acid in amounts sufficient to impart the desired alumina content to the finished catalyst. The aluminum salt reacts with the alkali metal carbonate thus precipitating alumina throughout the silica hydrogel and liberating carbon dioxide. The thus formed silica-alumina composite is then separated from the reaction mixture, washed free of soluble salts and dried by conventional methods to form a silica-alumina material suitable for use as a cracking catalyst or as a catalyst base.

While the process of the present invention may be carried out with any of the alkali metal silicates, and the aluminum salts of any of the strong mineral acids, such as aluminum sulfate, aluminum nitrate, aluminum chloride, etc., sodium silicate and aluminum sulfate will generally be employed because of their favorable economic position. For the purpose of simplicity, the invention will be further described employing sodium silicate and aluminum sulfate, although it is to be understood that the present invention is not limited to the use of these two materials.

The chemical reactions taking place in the present process are illustrated by the following equations:

$$Na_2O \cdot (X)SiO_2 + CO_2 \rightarrow Na_2CO_3 + (X)SiO_2 \quad (1)$$
$$3Na_2CO_3 + Al_2(SO_4)_3 \rightarrow Al_2O_3 + 3Na_2SO_4 + 3CO_2 \quad (2)$$

The starting sodium silicate solution may be any commercially available water glass having a weight ratio of $SiO_2:Na_2O$ from about 1:1 to 3.40:1, and preferably about 3.25:1, which accounts for the (X) in Equation 1. Water has not been included in Equation 1, and it is obviously possible to carry out the neutralization with a carbonic acid solution. However, the neutralization will usually be effected by the addition of carbon dioxide gas to the sodium silicate solution. This may be accomplished by bubbling the gas into a vessel containing the sodium silicate, or the reactants may be contacted in a mixing nozzle. Regardless of the method of mixing chosen, the reactants are desirably thoroughly agitated following contact and through formation of the silica hydrogel.

It is apparent from Equations 1 and 2 that for each mol of $Na_2O$ present in the starting sodium silicate solution, it is possible to precipitate one-third mol of alumina without the addition of any basic precipitant to the system. It is thus possible to prepare a silica-alumina gel catalyst by the method of the present invention containing up to about 15% by weight $Al_2O_3$, with commercial water glass having a $SiO_2:Na_2O$ ratio of about 3.2–3.4:1 without resorting to the use of ammonia. With silicates of $SiO_2:Na_2O$ ratios approaching 1:1, catalysts containing upward of 30% $Al_2O_3$ may be made without ammonia. A satisfactory commercially competitive catalyst containing 11–13% by weight $Al_2O_3$ can be prepared without the use of ammonia by the present process when neutralization of the silicate is not complete, for example, when it is only about 70% complete. Generally, however, the neutralization will be complete, that is to say, a stoichiometric amount of carbon dioxide based on the $Na_2O$ concentration of the starting sodium silicate solution will be employed. Regardless of whether neutralization is 70% or 100% complete, the resulting silica hydrogel will exhibit an alkaline pH, because of the presence of sodium carbonate. There is no apparent advantage in using a great excess of carbon dioxide, for example, 150–200% of that required for complete neutralization. The use of excess carbon dioxide will of course lower the pH of the resulting silica hydrogel through formation of sodium bicarbonate and adversely affect spontaneous precipitation of alumina. Upon the addition of aluminum sulfate to a silica hydrogel formed with a great excess of carbon dioxide there is formed a basic aluminum sulfate, and sulfate ions thus held are only very difficultly removed from the silica-alumina composite.

Regardless of the method of mixing employed, carbon dioxide is always added in amount sufficient to form the silica hydrogel. It is well known that the point of gelation of silica is dependent upon many factors, not the least of which are concentration of the neutralizing acid, temperature, and concentration of $SiO_2$ in the starting sodium silicate solution. Under normal conditions, a silica hydrosol is first formed, which after a period of a few minutes sets to a rather firm gel. The period of time preceding the actual setting of the gel, or set time, is primarily dependent upon the pH of the hydrosol. In the method of the present invention, set time is usually not more than about 10 minutes and in many instances is as short as 2 to 3 minutes. Agitation of the reaction mixture is continued during and subsequent to setting of the silica hydrosol. The hydrogel is then aged for a period of 10 minutes to an hour with continued agitation, which prevents setting to a hard mass and maintains the hydrogel in slurry form.

To the slurry of silica hydrogel thus formed, there is then added an aqueous solution of aluminum sulfate with continued agitation. The aluminum sulfate reacts with the sodium carbonate dispersed throughout the pores of the silica hydrogel thus precipitating alumina and liberating carbon dioxide, as illustrated in Equation 2. So long as the pH of the resulting mixture is above about 4.2, substantially all the alumina will be precipitated. It has been found that alumina concentrations in the final silica-alumina composite approach very closely the above indicated theoretical quantity of alumina obtainable. When it is desired to prepare a catalyst containing the maximum possible weight percent alumina without the use of a basic precipitant, it is desirable that the aluminum sulfate solution contain no free acid. If it does, this free acid tends to neutralize sodium carbonate thus removing a portion of the alkali necessary to precipitate all of the alumina from the aluminum sulfate solution. However, since alum solutions are prepared by dissolving alumina in sulfuric acid, the absence of excess acid is not always assured and occasionally the solution will contain about 1–2% free sulfuric acid. Under these circumstances, the theoretical quantity of alumina precipitatable by the sodium carbonate originally present will not be attained.

It is to be understood that the present invention provides a method for preparing a silica-alumina catalyst which eliminates the use of sulfuric acid and ammonia. However, when it is desired to prepare a catalyst containing more than 15% by weight alumina from a starting silicate solution of $SiO_2:Na_2O$ ratios of 3.2–3.4:1 by the present method, one may add an aluminum sulfate solution to the silica hydrogel in amount to provide the desired quantity of alumina, allow neutralization of the theoretical amount of aluminum sulfate by sodium carbonate present, and supplement the thus spent alkali by the addition of ammonia. As will be shown hereinafter, it is considerably more economical to cause precipitation of alumina through the use of sodium carbonate by the present method than to precipitate with ammonia.

The resulting slurry of silica-alumina hydrogel is allowed to age for up to about a half hour, after which the hydrogel is filtered and further processed according to conventional methods. After filtration, the usual procedure to dry, wash free of soda and sulfate ions and re-dry. If desired, the filtered material may be washed as a hydrogel prior to drying, and the drying may be a spray-drying operation resulting in the formation of silica-alumina microspheres. The order of washing and drying may, of course, be varied without departing from the spirit of the present invention.

The present invention is further illustrated by the following non-limiting examples.

EXAMPLE I

Fourteen pounds of carbon dioxide gas was bubbled through 960 pounds of a 6.4° Bé. sodium silicate solution ($SiO_2:Na_2O$ weight ratio equal to 3.2:1) originally at 114° F., with continued agitation. The amount of carbon dioxide added was sufficient to neutralize 75% of the $Na_2O$ present. A silica hydrogel formed and the addition of carbon dioxide was then suspended. The hydrogel was found to contain 4.7% $SiO_2$ and the reaction mixture exhibited a pH of 10.0. The hydrogel was aged with continued agitation for a period of 45 minutes, after which 100 pounds of an aluminum sulfate solution containing 6.6% $Al_2O_3$ and about 1% by weight free sulfuric acid was added. Carbon dioxide was evolved. Following the aluminum sulfate addition, the resulting silica-alumina composite (pH 5.5) was aged for a period of about 15 minutes. Following aging, the material was filtered, washed and dried in a conventional manner to form the final catalyst.

EXAMPLE II

The same quantity of the silicate solution of Example I at 120° F. was neutralized by bubbling 29 pounds of carbon dioxide gas therethrough in accordance with the general method of Example I. This quantity of carbon dioxide was sufficient to neutralize 110% of the $Na_2O$ present. A silica hydrogel was formed which contained 4.7% silica and exhibited a pH of 9.5. This hydrogel was aged for 20 minutes prior to the addition of an aluminum sulfate solution in amount equivalent to that of Example I. The resulting silica-alumina composite exhibited a pH of 5.9. It was aged 15 minutes prior to washing and drying.

EXAMPLE III

A similar catalyst was prepared by neutralizing the silicate of Example I at 100° F. with 11.5 pounds of carbon dioxide gas. This quantity of carbon dioxide was sufficient to neutralize 71% of the alkali present. The resulting silica hydrogel contained 4.6% $SiO_2$ and exhibited a pH of 10.1. It was aged 30 minutes prior to the addition of the aluminum sulfate solution of Example I. The resulting silica-alumina composite exhibited a pH of 6.2. It was aged 5 minutes prior to washing and drying.

EXAMPLE IV

A fourth catalyst was prepared by neutralizing the silicate of Example I at 80° F. with 49 pounds of carbon dioxide gas, an amount sufficient to neutralize in excess of 150% of the $Na_2O$ present. The resulting silica hydrogel contained 4.6% $SiO_2$ and had a pH of 9.2. After 10 minutes' aging, the aluminum sulfate solution of Example I was added. The resulting composite exhibited a pH of 4.9. It was aged 20 minutes prior to washing and drying.

For the purpose of comparison with the catalysts of Examples I to IV, a sample of commercial silica-alumina catalyst prepared by the above-described three-step process was obtained. Following preparation of the silica-alumina composite, the washing and drying technique followed in the three-step process was the same as that used for the catalysts of Examples I to IV. The analysis and physical properties of the three-step catalyst and the catalysts of Examples I to IV are set forth in the following table:

Tests were carried out to compare the activity of the catalyst of the present invention with that of the above commercial three-step catalyst. In carrying out the activity tests, 200 ml. of the deactivated catalyst were placed in a reactor and maintained at a temperature of 850° F. During a period of 2 hours, 238.2 ml. of

Table I
CATALYST

|  | Example I | Example II | Example III | Example IV | Average of Examples I, II, and III | Commercial Three-Step |
|---|---|---|---|---|---|---|
| Analysis (dry basis) Wt. Percent: | | | | | | |
| Total Volatiles | 11.77 | 17.29 | 9.44 | 10.82 | 12.8 | 11.5 |
| $Al_2O_3$ | 12.76 | 13.23 | 11.68 | 14.02 | 12.6 | 13.3 |
| $Na_2O$ | 0.027 | 0.030 | 0.043 | 0.011 | 0.033 | 0.06 |
| $SO_4$ | 0.21 | 0.27 | 0.11 | 1.18 | 0.21 | 0.21 |
| $CO_2$ | 0.02 | 0.22 | 0.12 | 0.005 | 0.12 |  |
| Kellogg Density, lbs./ft.³: | | | | | | |
| Loose | 32.8 | 29.5 | 26.3 | 36.3 | 29.5 | 36.3 |
| Freely Settled | 35.5 | 32.2 | 38.1 | 40.0 | 35.3 | 39.5 |
| Compacted | 46.6 | 41.6 | 47.3 | 53.8 | 45.2 | 46.8 |
| Surface Measurements: Pretreatment—3 hrs. @ 1,050° F.: | | | | | | |
| Surface Area, Sq.M./g | 518 | 505 | 482 | 482 | 502 | 452 |
| Pore Volume, cc./g | 0.59 | 0.68 | 0.54 | 0.39 | 0.60 | 0.49 |
| Pore Diameter, A° | 46 | 54 | 45 | 32 | 48 | 43 |
| Particle Density, g./cc | 0.98 | 0.90 | 1.03 | 1.21 | 0.97 | 1.09 |

It is readily apparent from Table I that, with the exception of the catalyst of Example IV, catalysts prepared by the method of the present invention are chemically and physically equal or superior to the commercial catalyst. The greatest difference between the catalyst of the present invention and the commercial catalyst appears to be in surface area, with the catalyst of the present invention showing approximately 10% greater surface area, and resulting improved activity, than catalysts produced by the three-step process. It is also apparent from the above table that the amount of carbon dioxide used in the preparation of the silica hydrogel definitely has an effect upon the soda chemically bound in the catalyst structure. The catalyst of Example IV, however, has a considerable amount of chemically bound sulfates which makes it commercially unacceptable, and the presence of excess sulfates can be laid directly to the great excess of carbon dioxide employed in the preparation of the silica hydrogel of Example IV. The catalyst of Example III is considered to be the best of the four prepared by the method of the present invention. However, an average of the catalysts of Examples I to III has a higher surface area and degree of purity than the commercial catalyst.

In order to determine the catalytic cracking activity and stability of a silica-alumina cracking catalyst, accelerated tests have been devised to simulate the conditions prevailing during the early period of catalyst use where the decrease of catalyst stability is most pronounced. Two prominent methods which were employed for testing the catalysts of the present invention involve thermal and steam deactivation of the catalyst. These methods are described in Industrial and Engineering Chemistry, November 1947, pp. 1138–1143, "Testing of Cracking Catalysts," by Conn and Connolly, and in Petroleum Refiner, June 1952, "Progress Made in Design of Catalyst Activity Test Units," by Ivey and Veltman. In general, a sample of fresh catalyst is compressed into pellets and split into two portions, one for thermal deactivation and one for steam deactivation. The thermal deactivation is carried out in a battery of three muffle furnaces at temperatures of 500° F., 1050° F. and 1550° F. The sample is moved from the low temperature to the next higher temperature muffle, remaining in each for three hours. Steam deactivation is carried out by holding the catalyst in an atmosphere of steam at 60 p.s.i.g. and 1050° F. for 24 hours.

virgin East Texas light gas oil was passed through the hot catalyst. The cracked products were recovered and separated. The fraction which distilled below 400° F., as well as gas and loss was determined, and designated as the distillate plus loss or, more simply, D+L. The results of these tests are as follows:

Table II
CATALYST

|  | Example I | Example II | Example III | Average of Examples I, II, III | Commercial Three-Step |
|---|---|---|---|---|---|
| Steamed Activity: | | | | | |
| Percent D+L | 29.5 | 30.7 | 31.0 | 30.4 | 29.8 |
| G.P.F. | 0.94 | 1.07 | 0.98 | 1.00 | 1.11 |
| C.P.F. | 1.23 | 1.23 | 1.01 | 1.17 | 1.01 |
| Thermal Activity: | | | | | |
| Percent D+L | Not run | Not run | 56.4 | Not run | 54.6 |
| G.P.F. | ---do--- | ---do--- | 0.92 | ---do--- | 1.0 |
| C.P.F. | ---do--- | ---do--- | 0.77 | ---do--- | 0.9 |

In the above table G.P.F. and C.P.F. refer to gas producing factor and carbon producing factor respectively. The values assigned these factors are relative to the gas and carbon produced by a standard catalyst, which is taken as 1.00 in both cases. These factors are a measure of stability.

A comparison of the tabulated results clearly shows that the silica-alumina gel catalyst prepared in accordance with the present invention is at least equivalent in steamed activity, and in the case of the catalysts of Examples II and III superior to the commercial catalyst. The catalyst of Example III is far superior in thermal activity, G.P.F. and C.P.F. to the commercial cracking catalyst prepared with the use of sulfuric acid and ammonia.

The present invention not only provides a method for preparing a cracking catalyst superior to presently available catalysts, but accomplishes this at a tremendous saving in raw materials through elimination of sulfuric acid and ammonia. The following table compares raw material requirements for a 13–14% $Al_2O_3$ catalyst prepared by the present process with those for an equivalent catalyst prepared by the three-step process, one of the most economical processes heretofore.

Table III

| Raw Material | Present Process | Three-Step Process |
|---|---|---|
| | (Tons/Ton bone dry catalyst) | |
| Sulfuric Acid (100%) | | 0.355 |
| Ammonia (anhydrous) | | 0.160 |
| Carbon Dioxide | 0.15–0.35 | |

While the price of the above raw materials may vary from time to time, it is readily seen that at any given time the saving afforded by the process of the present invention is indeed of considerable magnitude, and is a factor to be reckoned with.

Catalysts prepared by the method of the present invention are utilized in cracking reactions in the form of small pellets, granules or in a very finely divided, fluidized state. The general method of cracking with the catalysts of this invention usually involves contacting heated hydrocarbon feedstock with the catalyst at substantially atmospheric pressure and temperatures of about 850°–950° F., and fractionating the cracked products. The conditions and the manner of carrying out the cracking process are generally well known in the art.

I claim:

1. A process for preparing a silica-alumina gel catalyst composite containing about 10–40% alumina comprising contacting an aqueous alkali metal silicate solution with carbon dioxide in amount sufficient to convert at least 70% of the free alkali to alkali carbonate and form a silica hydrogel containing dissolved alkali metal carbonate, commingling with said hydrogel and the resulting dissolved carbonate an aqueous solution of an aluminum salt of a strong mineral acid whereby alumina is precipitated from said aluminum salt solution in and on said hydrogel, and washing and drying the resulting composite.

2. A process as set forth in claim 1 wherein the alkali metal silicate is sodium silicate.

3. A process as set forth in claim 1 wherein the aluminum salt is aluminum sulfate.

4. A process for preparing a silica-alumina gel catalyst suitable for use as a petroleum cracking catalyst composite containing about 15% alumina comprising neutralizing an aqueous sodium silicate solution with carbon dioxide in amount sufficient to convert susbstantially all of the soda to sodium carbonate with a minimum of bicarbonate formation to form a silica hydrogel containing dissolved sodium carbonate, commingling with said hydrogel and the resulting sodium carbonate an aqueous solution of aluminum sulfate in amount sufficient to provide the desired concentration of alumina in the final catalyst whereby substantially all of said aluminum sulfate is precipitated as alumina in and on said silica hydrogen upon contact with said sodium carbonate and carbon dioxide is evolved from the reaction mixture, washing and drying the resulting composite.

5. A process for preparing a silica-alumina gel catalyst containing 11–15 percent alumina comprising the steps of providing an aqueous sodium silicate solution having a silica-to-soda ratio of about 3.25 to 1, introducing carbon dioxide gas into said solution to substantially completely neutralize the soda with a minimum amount of bicarbonate formation thereby forming a silica hydrogel containing dissolved sodium carbonate, slowly adding to said hydrogel and the resulting sodium carbonate with agitation an aqueous aluminum sulfate solution containing about 1.02–2.0 pecent of free acid, thereby precipitating the aluminum sulfate as alumina in and on said hydrogel upon contact with said sodium carbonate with the evolution of carbon dioxide, separating the silica-alumina hydrogel from the reaction mixture and washing and drying the composite.

6. A process for preparing a silica-alumina gel catalyst containing about 10–40% alumina comprising reacting an aqueous alkali metal silicate solution with carbon dioxide gas in amount sufficient to convert at least 70% of the free alkali to alkali carbonate and form a silica hydrogel containing dissolved alkali metal carbonate, aging said hydrogel for a period of 10–60 minutes with agitation, commingling with said hydrogel and the resulting dissolved carbonate with continued agitation an aqueous solution of an aluminum salt of a strong mineral acid whereby alumina is precipitated in and on said hydrogel with an attendant liberation of carbon dioxide gas, and purifying and drying the resultant silica-alumina composite.

7. A process for preparing a silica-alumina gel catalyst containing about 10–40% alumina comprising the steps of providing an aqueous sodium silicate solution having a silica-to-soda ratio of about 1:1 to about 3.4:1, introducing carbon dioxide gas into said solution and thereby converting substantially all of the soda to sodium carbonate with a minimum of bicarbonate formation to form a silica hydrogel containing dissolved sodium carbonate, adding to said hydrogel and the resulting dissolved carbonate with agitation an aqueous aluminum sulfate solution and thereby precipitating the aluminum sulfate as alumina in and on said hydrogel with an attendant liberation of carbon dioxide, separating the resulting silica-alumina composite from the reaction mixture, and washing and drying said composite.

8. A process for cracking hydrocarbon oils which comprises passing the oil under cracking conditions through a cracking zone containing a silica-alumina catalyst having about 10–40% alumina prepared by contacting an aqueous alkali metal silicate solution with carbon dioxide to form a silica hydrogel containing dissolved carbonate, commingling with said hydrogel and the resulting dissolved carbonate an aqueous solution of an aluminum salt of a strong mineral acid whereby alumina is precipitated from said salt solution in and on said hydrogel, and washing and drying the resulting silica-alumina composite.

References Cited in the file of this patent

UNITED STATES PATENTS

| 2,174,177 | Kraybill | Sept. 26, 1939 |
| 2,386,337 | Moyer | Oct. 9, 1945 |
| 2,469,314 | Ryland et al. | May 3, 1949 |
| 2,595,339 | Herder et al. | May 6, 1952 |
| 2,601,235 | Alexander | June 24, 1952 |

FOREIGN PATENTS

| 348,769 | Germany | Feb. 16, 1922 |

OTHER REFERENCES

Alexander et al.: National Petroleum News, pp. R–537, R–538, Aug. 2, 1944.

UNITED STATES PATENT OFFICE
CERTIFICATE OF CORRECTION

Patent No. 2,886,512                                                                  May 12, 1959

Milton E. Winyall

It is hereby certified that error appears in the printed specification of the above numbered patent requiring correction and that the said Letters Patent should read as corrected below.

Column 7, lines 45 and 46, strike out "catalyst"; lines 49 and 50, for "susbstantially" read -- substantially --; line 58, after "silica" for "hydrogen" read -- hydrogel --; column 8, line 5, for "about 1.02-2.0 pecent" read -- about 1.0-2.0 percent --.

Signed and sealed this 1st day of September 1959.

(SEAL)
Attest:

KARL H. AXLINE
Attesting Officer

ROBERT C. WATSON
                                                                                                         Commissioner of Patents